Figure 1:
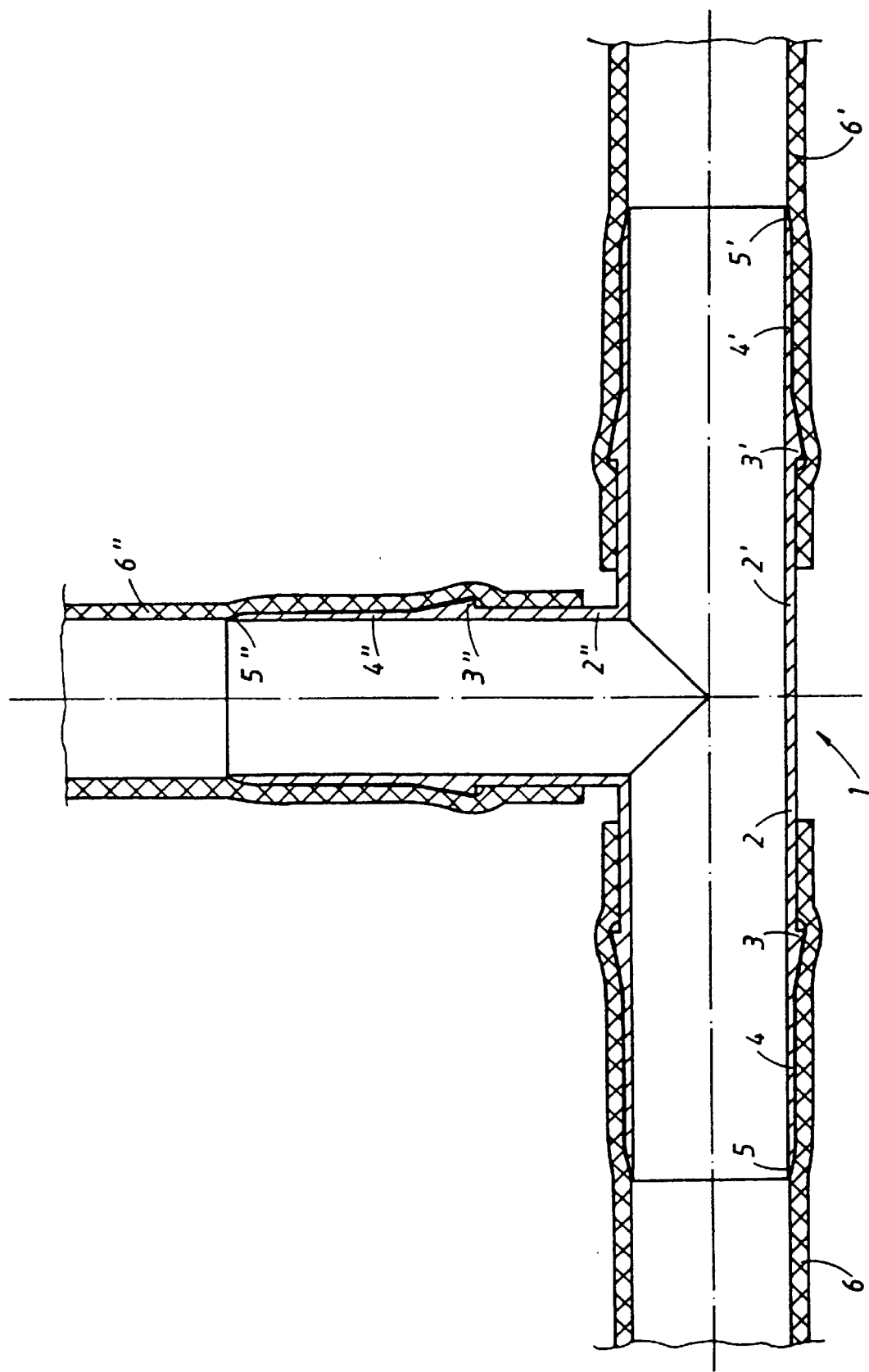

United States Patent
Imgram

[19]

[11] Patent Number: 5,937,501
[45] Date of Patent: Aug. 17, 1999

[54] PROCESS FOR MAKING TUBE CONDUIT CONNECTIONS

[76] Inventor: Friedrich Imgram, Am Frankfurter Weg 2, 63133 Heustenstamm, Germany

[21] Appl. No.: 08/964,078

[22] Filed: Nov. 4, 1997

Related U.S. Application Data

[62] Division of application No. 08/922,985, Sep. 2, 1997, abandoned, which is a continuation of application No. 08/530,297, filed as application No. PCT/EP94/00874, Mar. 21, 1994, abandoned.

[30] Foreign Application Priority Data

Mar. 27, 1993 [DE] Germany .............................. 43 10 000

[51] Int. Cl.⁶ .................................................. B23P 19/02
[52] U.S. Cl. .............................. 29/525; 29/237; 285/238; 285/242; 285/382.4
[58] Field of Search ............................. 29/523, 525, 237; 285/238, 242, 256, 259, 382, 382.4

[56] References Cited

U.S. PATENT DOCUMENTS

| | | |
|---|---|---|
| 295,109 | 3/1884 | Bulcroft . |
| 1,171,551 | 2/1916 | Stepnens . |
| 2,367,447 | 1/1945 | Strout . |
| 4,054,984 | 10/1977 | Ball et al. . |
| 4,635,972 | 1/1987 | Lyall . |
| 4,783,303 | 11/1988 | Imgram . |
| 5,123,627 | 6/1992 | Hodges . |
| 5,568,944 | 10/1996 | Kawasaki . |

FOREIGN PATENT DOCUMENTS

| | | |
|---|---|---|
| 124668 | 6/1974 | Australia . |
| A-81607/87 | 5/1988 | Australia . |
| 1055815 | 2/1954 | France . |
| 3817442 | 11/1989 | Germany . |
| 8914321 | 3/1990 | Germany . |
| 773033 | 4/1957 | United Kingdom . |
| 903757 | 8/1962 | United Kingdom . |
| WO 94/18486 | 8/1994 | WIPO . |

OTHER PUBLICATIONS

UPONOR brochure entitled VPE.
Plastic Pipes and Systems in the Domestic Water Potable Installation, by Manfred E. Hoffman et al., 1988.
Cross–linked Polyethylene (VPE)—a Novel Pipe Material for Gas Distribution, by Willi Flieg, 1990.

*Primary Examiner*—David P. Bryant
*Attorney, Agent, or Firm*—Lee, Mann, Smith, McWilliams, Sweeney & Ohlson

[57] ABSTRACT

The tube conduit connection contains a tube conduit connector (1) including at least one connecting member (2,2',2") and a tube end (6) which is made of a thermoelastic cross-linked polyolefin and which is firmly and gas-tightly applied to the connecting member by expansion and self-reconversion of the tube end. The connecting member (2,2',2") contains a surface structure (3,3',3") which is outwardly followed by an elongation (4,4',4") having a chamfered end (5,5',5").

4 Claims, 2 Drawing Sheets

PROCESS FOR MAKING TUBE CONDUIT CONNECTIONS

This application is a division of Ser. No. 08/922,985, filed Sep. 2, 1997, which is a continuation of Ser. No. 08/530,297, filed Sep. 26, 1995, which is the national stage of PCT/EP94/00874, filed Mar. 21, 1994, which is now abandoned.

The invention relates to a tube conduit connection containing a tube conduit connector having a connecting member which comprises a surface structure, and a tube end which has been expanded at ambient temperature and which is formed at the end of a tube which is self-reconvertable at ambient temperature, the tube end being firmly and sealingly connected to the connecting member.

The invention also relates to a tube conduit connector for producing firm and sealing connections to tube conduits, the tube conduit connector containing at least one connecting member having a surface structure. Finally, the invention also relates to a method of using a hydraulic pulling device for connecting a tube conduit connector to a tube end, which pulling device contains at least one hydraulic cylinder-piston unit, retaining means for respectively retaining the tube end or the tube conduit connector, movable retaining means for respectively retaining the tube conduit connector or the tube end, and a hydraulic pump connected to the at least one hydraulic cylinder-piston unit.

From published European Patent Application No. 0,530,387, there is known to produce firm and gas-tight tube conduit connections at ambient temperature using tubes made of a material like medium density, high density or thermo-elastic, cross-linked polyolefin. Therefore, the tube end is reversibly expanded and applied to the connecting member of the tube conduit connector. An expanding mandrel is usually employed for this purpose. Even under these conditions, the material, particularly the thermo-elastic cross-linked polyolefin is subject to self-reconversion into the original condition. The self-reconversion is of sufficient rate also at ambient temperature in order to form a firm and gas-tight connection to the tube conduit connector after expansion. The firm and gas-tight connection therein is effected by means of a surface structure which is present at the connecting member of the tube conduit connector and about which the expanded tube end contracts so that there is formed a large surface area, very tight connection between the tube end and the connecting member of the tube conduit connector.

It has been found in practice that these known tube conduit connections which are produced by means of the expanding mandrel, can be made with good success when using tube diameters in the range of 50 mm and above. With smaller diameters, there exists a problem in that such narrower tube conduit is relatively flexible and that the tube end eventually can become disconnected from the connecting member of the tube conduit connector to a small extent upon bending of the tube conduit. This small extent is sufficient for causing an undesired leak at the location of the connection.

In correspondence therewith it is the object of the invention to provide a tube conduit connection to the tube conduit connector which tube conduit connection is sufficiently tight even upon bending of the tube conduit, and to further provide a tube conduit connector which renders possible producing such sufficiently tight connection.

According to the invention, this object is achieved with respect to the tube conduit connection in that the connecting member comprises an elongation which extends from the surface structure and forms the free end of the connecting member.

A tube conduit connector according to the invention is characterized in that the connecting member comprises an elongation which extends from the surface structure and forms the free end of the connecting member.

In this manner it is achieved that the tube end which is applied to the connecting member of the tube conduit connector, remains firmly and gas-tightly connected to the tube conduit connector even if the tube is subjected to bending stress.

Advantageous further developments of the inventive tube conduit connections and tube conduit connectors are characterized in the dependent claims.

Likewise it has been found in practice that the expansion of the tube end by using an expanding mandrel may result in problems in the case of smaller tube diameters. It has been found that a hydraulic pulling device which is known as such for producing connections using plastic tubing, can be employed with advantage for producing connections to tubes which are made of relatively stiff materials such as thermo-elastic cross-linked polyolefin, particularly at ambient temperature and in a manner such that the material reverts to the original condition by self-reconversion after expansion whereby a firm and gas-tight connection is formed.

Exemplary embodiments of the invention are illustrated in the drawings and will be explained and described hereinbelow in detail by means of the reference characters. There are shown in FIG. 1 a sectional view of a tube conduit connection according to the invention; and FIG. 2 a schematic view of a hydraulic pulling device for producing the tube conduit connection shown in FIG. 1.

In the sectional view of FIG. 1, there will be recognized a tube conduit connector 1 in the form of a T-piece having three connecting members 2, 2', and 2". Each one of the connecting members 2, 2', and 2" contains a respective surface structure in the form of a reinforcement 3, 3'and 3", which may also be constructed as a groove or bead or the like. In the illustrated embodiment the reinforcements steeply descend inwardly to the outer diameter of the respective connecting member whereas the reinforcements taper outwardly to the free end. There is thus formed a structure which facilitates sliding on the tube end due to the ramp shape but which otherwise presents sufficient resistance against pulling off the applied tube end again due to the inner steep descent.

The reinforcements 3, 3', and 3" are adjoined toward the exterior by respective elongations 4, 4', and 4" which have the same inner diameter as the associated connecting members 2, 2', and 2" but which may have, if desired, an outer diameter slightly reduced relative to that of the respective connecting member, as illustrated. The free end of the elongations 4, 4', and 4" is provided with respective chamfers 5, 5', and 5" in order to facilitate the introduction into the related tube end.

Identically formed tube ends 6 which are applied to the connecting members 2, 2', and 2", will be recognized at the respective connecting members 2, 2', and 2". In particular, these tube ends or tubes are designed such that their inner diameter is substantially equal to the inner diameter of the respective connecting members 2, 2', and 2". In this manner it will be avoided that edges are formed on the inside at the transition from the tube ends 6 to the respective connecting members which edges represent flow resistances to the throughflow of the medium respectively flowing therethrough. If such flow resistances are no object, other relative inner diameter relations can, of course, be selected.

In the illustrated exemplary embodiment, the tubes or tube ends 6 are made of thermo-elastic cross-linked polyolefin which is expanded at ambient temperature and applied to or pushed onto the respective connecting member 2, 2', or 2" in the expanded condition. It will be recognized that the expanded tube end 6 will be tightly applied to the respective connecting member upon self-reconversion and thereby contracted around the respective reinforcement 4, 4', and 4". Due to the elongation 4, 4', and 4" the length of the connection will be increased and, due to the hold at the surface structure of the respective connecting member, there will be formed a large surface area connection, which remains firm and gas-tight even under bending stress effective at the associated tube.

Figure 2:
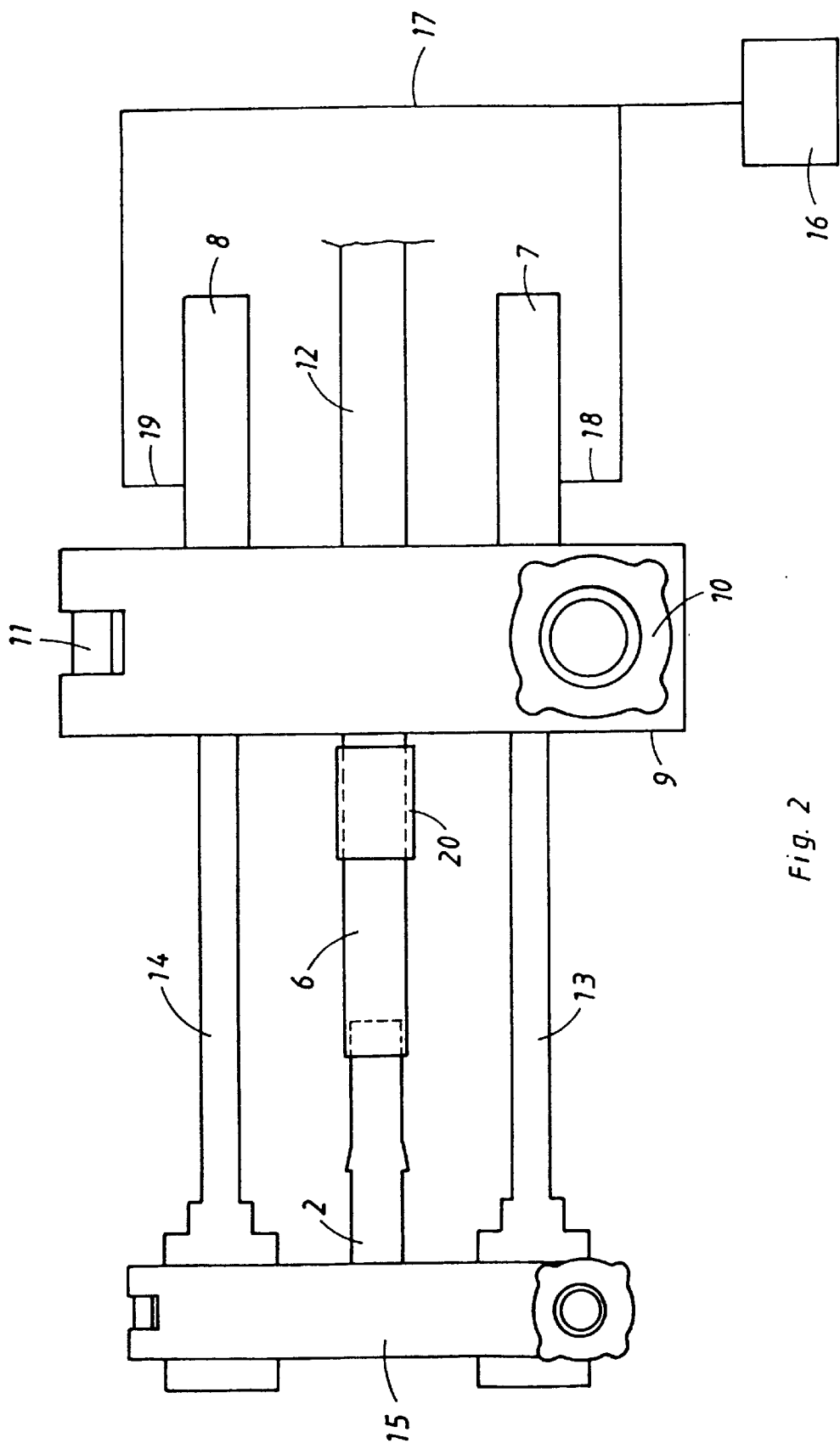

As a result of the expanding operation, the tube conduit connection described hereinbefore may eventually still contain a reinforcement 20, see FIG. 2, which is applied to the outside in the region adjacent the expanded tube end 6. Such reinforcement 20 may consist of an elastomeric, thermoplastic or thermo-elastic material having higher elasticity than the material of the tube, however, may also be made of the same material as the tube.

In the illustrated exemplary embodiment, the tube conduit connector 1 is constructed as a T-piece. Instead, the tube conduit connector 1 may have a Y-shape or may be differently shaped, for example, also as a simple tube connector having just two connecting members. In the most simple case, the connecting member may also be formed by a correspondingly constructed tube end in the event that a direct connection is intended to be formed between two tube ends. In the illustrated exemplary embodiment, the tube conduit connector consists of metal, particularly bronze; it may also consist of other materials like glass or plastic and also of thermo-elastic cross-linked polyolefin.

For producing the connection between a connecting member of the aforementioned type and a tube end, there may serve, for instance, a hydraulic pulling device as schematically illustrated in FIG. 2; such pulling device is known as such for use in connection with plastic tubes. It has been found that this hydraulic pulling device can also be used with advantage for reversibly expanding at ambient temperatures the tube ends of tubes which are made of thermo-elastic cross-linked polyolefin.

Two hydraulic cylinders 7 and 8 will be recognized in FIG. 2 and are arranged parallel to each other and bridged by first retaining means 9. The first retaining means 9 include a knurled screw 10 or the like at one of its ends and a hinge 11 at the other end. Two retaining members of the first retaining device 9 are interconnected by means of the hinge 11 such that the retaining members can be opened and receice a tube end 6 of a tube 12 therebetween and retain the same in the closed state.

From the hydraulic cylinders 7 and 8 respective piston rods 13 and 14 protrude and extend parallel to each other; free ends thereof are bridged by second retaining means 15. The second retaining means also comprise hinge-connected retaining members between which a tube connector, for example, a tube connector 1, can be received and retained such that, as shown, a connecting member 2 protrudes from the second retaining means 15 towards the tube end 6.

A manually operable hydraulic pump 16 is connected through a hydraulic conduit 17 to connectors 18 and 19 at the respective hydraulic cylinders 7 and 8. It will be recognized that, upon actuating the hydraulic pump 16, the piston rods 13 and 14 are retracted into the respective hydraulic cylinders 7 and 8. As a result, the second retaining means 15 conjointly with the connecting member 2 is pulled towards the free tube end 6 and into the same. There is directly obtained in this manner a firm and gas-tight connection between the connecting member 2 and the tube end 6.

For supporting the tube end 6 against deformation during the pulling-in operation of the connecting member 2, it is provided that the tube end 6 is surrounded by a reinforcement 20, which is made of an elastomeric, thermoplastic or thermo-elastic material, in the region which protrudes beyond the first retaining means 9 and which is not applied to the connecting member 2 or adjoins the tube end 6 which is intended to be expanded. The material of the reinforcement 20 may be more elastic than the material of the tube but may also be made of the same material. After expansion of the tube end 6, the reinforcement 20 may be removed or left to remain at the tube end 6.

The hydraulic pulling device, of course, may also be operated in a manner such that the tube end 6 is inserted into the second retaining means 15 and the tube conduit connector having the connecting member 2, is inserted into the first retaining means 9.

Instead of the hydraulic pulling device as described hereinbefore, an other hydraulic apparatus (not illustrated) having only one hydraulic cylinder and also known as such, may be used for the same purpose. Therein, either the retaining means for respectively retaining the tube end or a tube conduit connector is attached to a stationary support while a retaining means for respectively retaining the tube conduit connector or the tube end is connected to the piston rod and guided by guide means. The hydraulic cylinder is connected to a manually operated pump and actuation thereof will pull the tube end onto the tube conduit connector.

I claim:

1. A method of producing a tube conduit connection comprising the steps of:

providing a pulling device having at least one pressure fluid operable cylinder-piston unit comprising at least one cylinder, at least one piston having a piston rod and being movable within said at least one cylinder, first retaining means, second retaining means, and a fluid pressure pump connected to said at least one pressure fluid operable cylinder;

selectively retaining either a tube end of a tube, which is made of thermo-elastic cross-linked polyethylene, or a tube conduit connector with said first retaining means;

selectively retaining with said second retaining means the other one of said tube end and said tube conduit connector, said tube conduit connector having a connecting member provided with a surface structure and an elongation in the form of a structureless cylindrical tube which extends from said structure and defines a free end of said connecting member;

operating said fluid pressure pump in order to thereby move said at least one piston and thereby said first and said second retaining means relative to each other in order to thereby produce a tube conduit connection between said tube end and said connecting member of said tube conduit connector; and during said step of moving said first and second retaining means relative to each other, inserting said connecting member into said tube end and simultaneously expanding said tube end to form a direct, firm and sealing connection between said tube end and said connecting member at ambient temperature.

2. The method of claim 1 including the step of providing said tube end with a reinforcement made of an elastic material in a region adjacent a region of said tube end which is subject to expansion during said step of inserting said tube conduit connector into said tube end.

3. The method of claim 1 wherein:

said step of providing said at least one pressure fluid operable cylinder-piston unit entails providing two pressure fluid operable cylinder-piston units;

arranging said two pressure fluid operable cylinder-piston units in a manner such that said piston rods extend parallel to each other;

mounting said first retaining means at said two cylinders of said two pressure fluid operable cylinder piston units and thereby bridging said two cylinders;

said first retaining means comprising two retaining members each having two opposite ends;

said two retaining members being hingedly connected at one of said two opposite ends and being releasably connected at the other one of said two opposite ends;

mounting said second retaining means at said piston rods of said two pressure fluid operable cylinder piston units and thereby bridging said two piston rods;

said second retaining means comprising two retaining members each having two opposite ends; and said two retaining members being hingedly connected at one of said two opposite ends and being releasably connected at the other ones of said two opposite ends.

4. The method of claim 1 wherein:

said step of providing said at least one pressure fluid operable cylinder-piston unit entails providing a single pressure fluid operable cylinder-piston unit including a single cylinder and a single piston having a piston rod; and providing a stationary support and mounting said first retaining means at said stationary support;

connecting said second retaining means to said single piston rod; and providing guide means for guiding said second retaining means during movement of said piston rod relative to said stationary support.

\* \* \* \* \*